US010424176B2

(12) United States Patent
Shahid et al.

(10) Patent No.: US 10,424,176 B2
(45) Date of Patent: Sep. 24, 2019

(54) AMBER ALERT MONITORING AND SUPPORT

(71) Applicant: Harman International Industries, Incorporated, Stamford, CT (US)

(72) Inventors: Syed Hassam Shahid, Vernon Hills, IL (US); David Brenner, Round Lake, IL (US); Michael Labowicz, Palatine, IL (US); Peter Andrew Moody, Carmel, IN (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/717,739

(22) Filed: Sep. 27, 2017

(65) Prior Publication Data

US 2019/0096215 A1 Mar. 28, 2019

(51) Int. Cl.
*G08B 21/02* (2006.01)
*G06K 9/00* (2006.01)
(Continued)

(52) U.S. Cl.
CPC ......... *G08B 21/02* (2013.01); *G06K 9/00791* (2013.01); *G06K 9/00805* (2013.01);
(Continued)

(58) Field of Classification Search
CPC ........... G06K 9/00806; G06K 9/00798; G06K 9/10178; G06K 9/629; G06K 9/00791; G06K 9/00832; G06K 9/00979; G06K 9/3258; G06T 2207/10016; G06T 2207/30261; G06T 7/2033; G06T 7/208

See application file for complete search history.

(56) References Cited

U.S. PATENT DOCUMENTS 6,433,706 B1 * 8/2002 Anderson, III ........ G07C 5/008
340/933
6,982,654 B2 * 1/2006 Rau ..................... G08G 1/0175
340/539.1

(Continued)

OTHER PUBLICATIONS

"AMBER Alert—America's Missing: Broadcast Emergency Response," U.S. Department of Justice Programs Website, Available Online at https://www.amberalert.gov/, Available as Early as Sep. 23, 2004, 2 pages.

*Primary Examiner* — Bobbak Safaipour
(74) *Attorney, Agent, or Firm* — McCoy Russell LLP

(57) ABSTRACT

Embodiments are disclosed for responding to an incoming alert using vehicle resources to scan and report on an environment of a vehicle. An example an in-vehicle computing system of a vehicle includes a sensor subsystem in communication with a sensor, a communication interface, a processor, and memory storing instructions executable by the processor to receive, via the communication interface, an alert including one or more alert parameters, instruct the sensor to scan an assigned region around the vehicle, receive, from the sensor, locally scanned data corresponding to the assigned region, determine that the scanned data includes an object having features matching a selected alert parameter of the one or more alert parameters, and transmit, to an alert service, a notification identifying the object and the features matching the selected alert parameter, the notification including a location of the object.

20 Claims, 9 Drawing Sheets

(51) Int. Cl.
*G06K 9/46* (2006.01)
*G06K 9/32* (2006.01)
*G08G 1/017* (2006.01)
*G06K 9/62* (2006.01)
*G08G 1/00* (2006.01)

(52) U.S. Cl.
CPC ......... *G06K 9/3258* (2013.01); *G06K 9/4652* (2013.01); *G06K 9/6201* (2013.01); *G08G 1/0175* (2013.01); *G06K 2209/15* (2013.01); *G06K 2209/21* (2013.01); *G08G 1/205* (2013.01)

(56) References Cited

U.S. PATENT DOCUMENTS

| | | | | |
|---|---|---|---|---|
| 7,711,150 B2* | 5/2010 | Simon | | G06K 9/209 |
| | | | | 382/105 |
| 9,305,459 B2* | 4/2016 | Rangarajan | | G08G 1/0962 |
| 9,600,734 B2* | 3/2017 | Prakash | | G06K 9/00791 |
| 9,610,893 B2* | 4/2017 | Lopez-Hinojosa | | H04W 4/90 |
| 2006/0103568 A1* | 5/2006 | Powell | | G01S 13/74 |
| | | | | 342/42 |
| 2009/0322560 A1* | 12/2009 | Tengler | | G08G 1/0104 |
| | | | | 340/905 |
| 2011/0102194 A1* | 5/2011 | Kinoshita | | G01C 21/26 |
| | | | | 340/905 |
| 2013/0257631 A1* | 10/2013 | Rangarajan | | G08G 1/0962 |
| | | | | 340/901 |
| 2015/0023668 A1* | 1/2015 | Spaulding | | H04B 10/1129 |
| | | | | 398/106 |
| 2015/0057881 A1* | 2/2015 | Raab | | H04M 1/72536 |
| | | | | 701/36 |
| 2017/0213462 A1* | 7/2017 | Prokhorov | | G08G 1/0965 |
| 2017/0263129 A1* | 9/2017 | Kasami | | G08G 1/161 |
| 2018/0114076 A1* | 4/2018 | Miller | | B60R 1/00 |

\* cited by examiner

AMBER ALERT MONITORING AND SUPPORT

FIELD

The disclosure relates to automatically responding to emergency alerts in a vehicle.

BACKGROUND

Vehicles may be equipped with cameras or other sensing devices to detect surroundings of the vehicles. For example, a vehicle may include a plurality of cameras or other sensors around a perimeter of the vehicle (e.g., on different sides of the vehicle, on a front of the vehicle, on a rear of the vehicle, etc.) to capture a view of a road on which the vehicle is traveling, neighboring vehicles, and/or other objects near the vehicle.

In-vehicle computing systems and/or devices connected to the vehicle (e.g., mobile devices of occupants) may be connected to communication services that provide emergency alerts, such as emergency weather alerts, emergency traffic alerts, and America's Missing: Broadcast Emergency Response (AMBER) alerts. Received alerts may include details for recipients to respond to the alert. For example, AMBER alerts may include information regarding a person or vehicle of interest that may be involved in suspect activity.

SUMMARY

Vehicle operators may be targets for emergency alerts such as AMBER alerts, as travelling vehicles may cover large areas and thereby effectively expand a region that may be scanned for suspicious activities, vehicles, and/or people. However, tasking a civilian driver of a vehicle with visually scanning for suspects may distract the driver from vehicle operating tasks. Even if the driver does not perform the visual scanning, the initial presentation of the alert may be an additional source of distraction.

The disclosure provides an automated vehicle-based system that processes incoming alerts (e.g., incoming AMBER alerts), utilizes vehicle sensors to scan and identify environmental objects or people that match information in the alerts, and transmits the identified information to a third party (e.g., a law enforcement agency). An example in-vehicle computing system includes a sensor subsystem in communication with a sensor, a communication interface, a processor, and memory storing instructions executable by the processor to receive, via the communication interface, an alert including one or more alert parameters, instruct the sensor to scan an assigned region around the vehicle, receive, from the sensor, locally scanned data corresponding to the assigned region, determine that the scanned data includes an object having features matching a selected alert parameter of the one or more alert parameters, and transmit, to an alert service, a notification identifying the object and the features matching the selected alert parameter, the notification including a location of the object.

An example method for responding to an incoming alert with an automatic alert processing system of a vehicle includes scanning an assigned region around a vehicle for an object matching one or more alert parameters of the incoming alert, the one or more alert parameters describing one or more target objects, and transmitting, to an alert service, a notification indicating a location of a found object that matches at least a selected parameter of the one or more alert parameters of the incoming alert, the notification including a confidence score indicating a likelihood that the found object matches one or more target objects of the incoming alert.

Another example in-vehicle computing system includes a sensor subsystem in communication with an optical sensor, a communication interface, a processor, and memory storing instructions executable by the processor to receive, via the communication interface, an alert including one or more alert parameters associated with one or more target objects, instruct the optical sensor to scan a first assigned region around the vehicle, and determine, using a first set of processing resources, that scanned data corresponding to the first assigned region includes an object having features matching a selected alert parameter of the one or more alert parameters. The instructions are also executable to instruct the optical sensor to scan a second assigned region around the vehicle, the second assigned region being smaller than the first assigned region and targeting the object, determine, using a second set of processing resources analyzing scanned data corresponding to the second assigned region, that the object has additional features matching one or more additional alert parameters of the one or more alert parameters, and transmit, to an alert service, a notification identifying the object and each of the features matching each associated alert parameter of the one or more alert parameters, the notification including a location of the object.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1A:
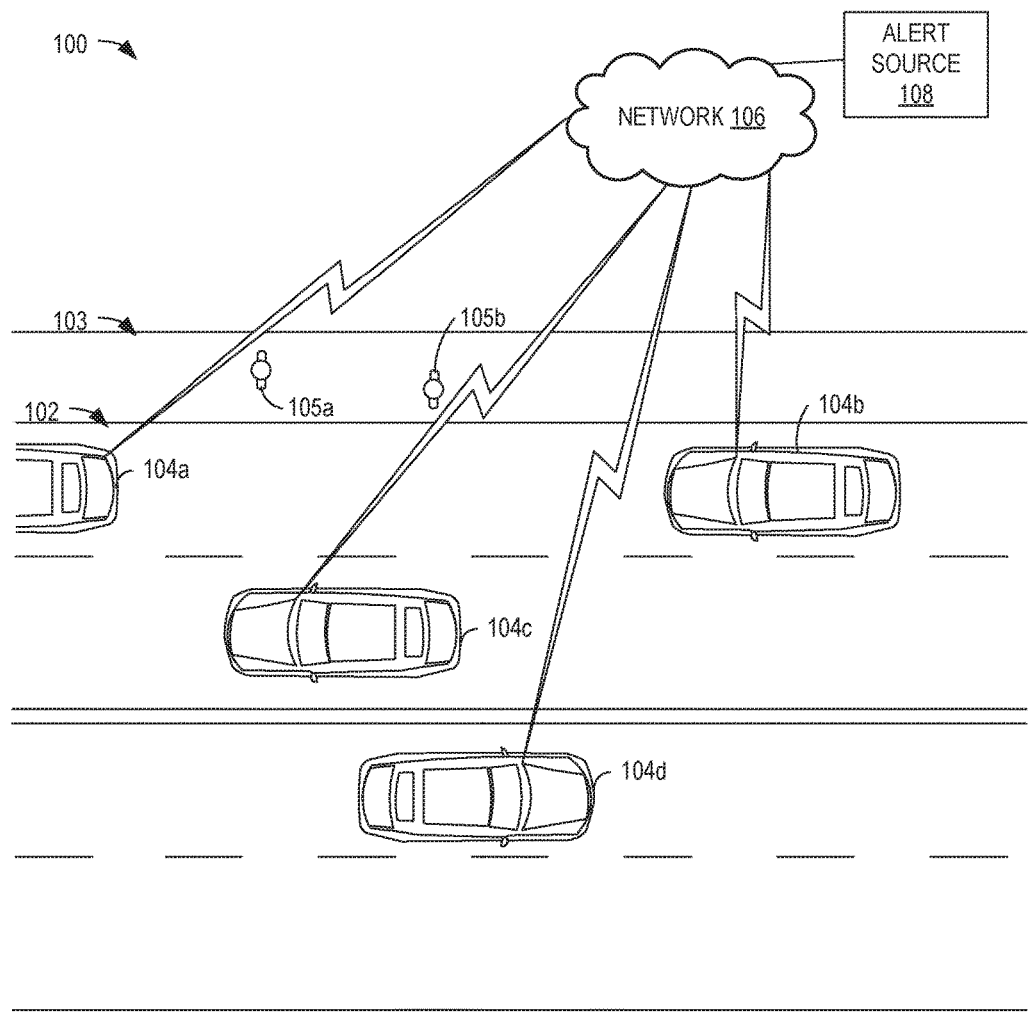
FIGS. 1A-1C show an example alert distribution and vehicle response in accordance with one or more embodiments of the present disclosure.

Emergency alerts, such as AMBER alerts, may be transmitted to the public to provide the public with a description of individuals, vehicles, and/or other details related to an emergency situation. For example, AMBER alerts may include a description of a suspect, an individual in danger, and a vehicle associated with the suspect/individual. A by-stander or driver that receives the alert may act as the "eyes and ears" of law enforcement to provide valuable tips regarding a location of the suspect/individual, which may lead to the apprehension of the suspect.

For a driver, an incoming alert may serve as a distraction, as the driver listens to or reads the alert, and if the driver attempts to identify whether anything or anyone in the environment matches the descriptions provided in the alert. Furthermore, the driver may only have a single vantage point from the vehicle (e.g., from the driver's seat of the vehicle) and may be dividing his/her attention between driving tasks and viewing the environment to identify information relevant to the alert. Accordingly, the driver may not identify such information with a high level of accuracy and/or efficiency.

The systems and methods provided in the disclosure minimize driver distraction resulting from incoming alerts, and increases efficiency and accuracy of responding to received alerts. For example, the systems and methods may include the use of cameras or other sensors located in various regions of a vehicle to scan a large area of the environment around the vehicle and identify features that are relevant to a received alert (e.g., a suspect/individual matching a description in the alert, a vehicle/license plate matching a description in the alert, etc.). The sensors of the vehicle that identify the relevant features (and/or other sensors working in coordination) may also identify additional details identifying a status of the recognized features (e.g., a heading direction and speed of a vehicle matching the description in the alert) and capture real-time imagery of the recognized features. The additional information may be transmitted to a third party, such as a law enforcement agency, for further review. The law enforcement agency may use captured information from multiple automatic alert processing systems in multiple vehicles to help locate a person or vehicle of interest. As will be discussed further, vehicles may also utilize vehicle-to-vehicle communication to coordinate scanning and responses to received alerts.

It is to be understood that the disclosure may refer to an AMBER alert as an example of an emergency alert that may be responded to more efficiently through the use of the disclosed automatic alert processing methods and systems. However, the efficiency of the disclosed automatic alert processing methods and systems may also benefit other types of emergency alerts. Accordingly, description herein that is directed toward AMBER alerts and associated data may likewise be applied to any other type of emergency alerts and associated data without departing from the scope of the disclosure.

Figure 1B:
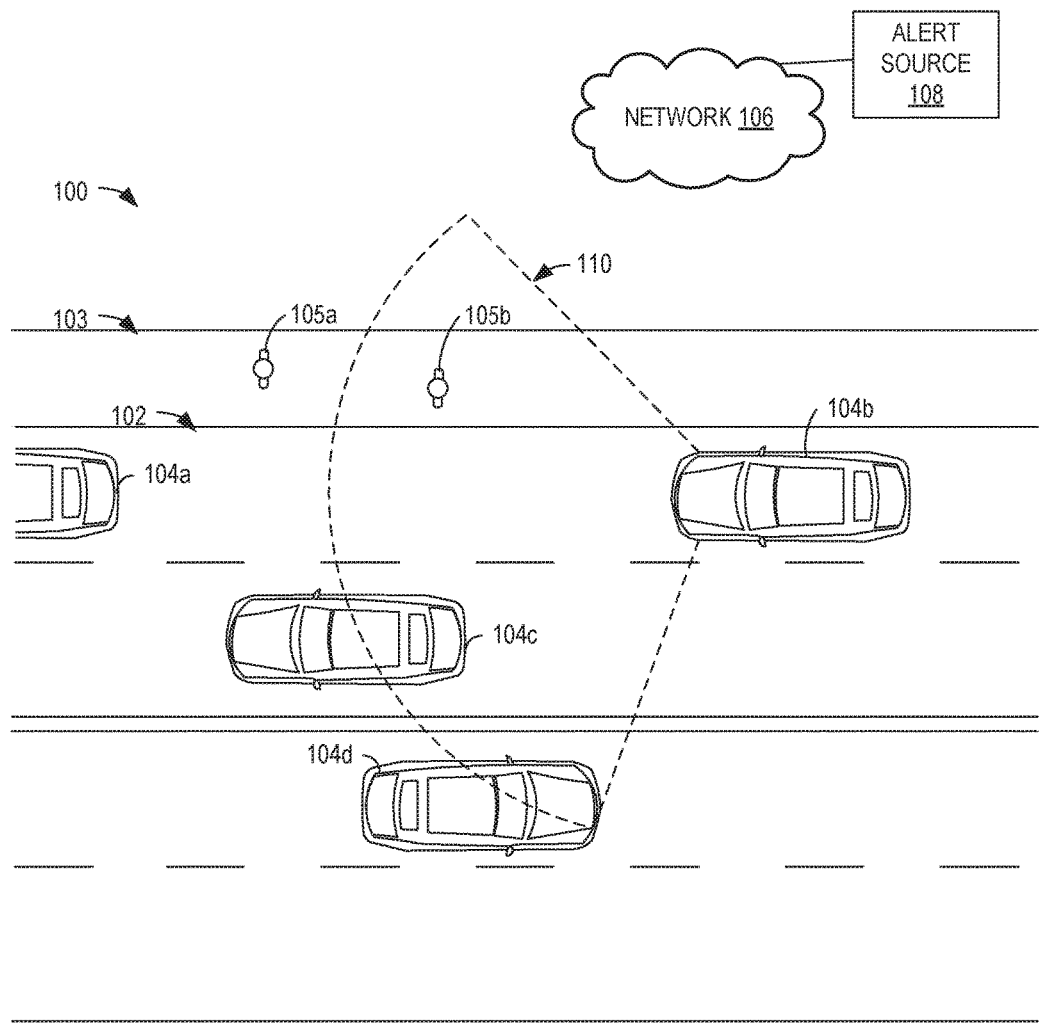
Figure 1C:
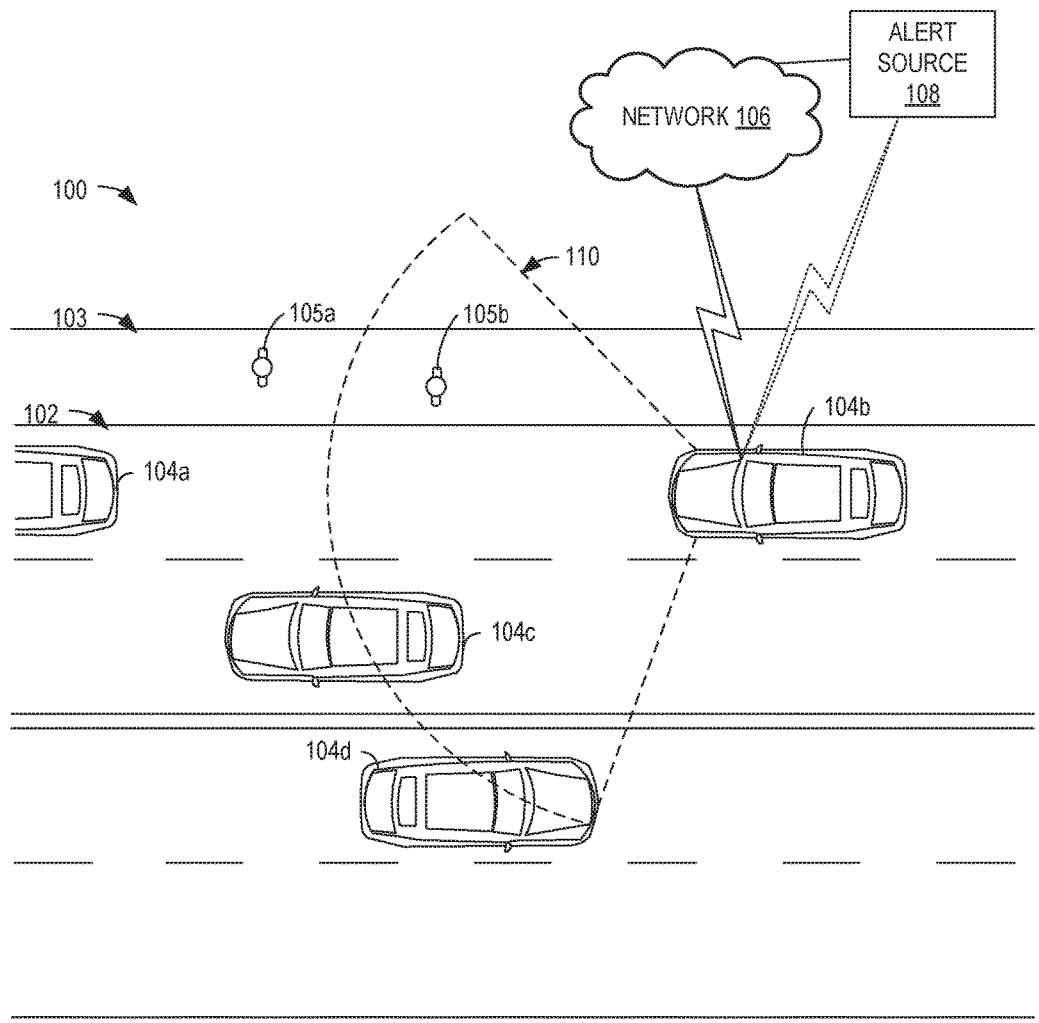

FIGS. 1A-1C illustrate an example alert environment 100 for a group of vehicles that may receive an emergency alert, such as an AMBER alert. Environment 100 includes a portion of a roadway 102, on which vehicles 104a, 104b, 104c, and 104d are travelling, and a portion of a sidewalk 103, on which pedestrians 105a and 105b are walking. Each vehicle may be communicatively connected to and/or otherwise able to receive data from a network 106. For example, network 106 may include or represent a cellular network, a radio broadcast system, an ad hoc local network (e.g., created between groups of vehicles), and/or any other wireless network or data transmission system. Network 106 may be individually connected to each vehicle in some examples. In additional or alternative examples, network 106 may broadcast information across a broadcast range (e.g., from one or more transmission points), such that any vehicle with a compatible data receiver within the broadcast range of the network may receive the broadcast information.

Network 106 may be communicatively coupled to alert source 108 and configured to receive alert data from alert source 108. Alert source 108 may include or be further communicatively coupled to an authority such as a law enforcement agency or other associated computing system. For example, an alert may be generated at alert source 108 including data from the law enforcement agency regarding information identifying a suspect and/or an individual in danger (e.g., height, weight, hair color, clothing, distinctive markings, etc.) and/or information identifying vehicles associated with the suspect or individual (e.g., make, model, year, color, license plate number, etc.). As shown in FIG. 1A, the alert generated at alert source 108 may be provided or transmitted to network 106 for distribution to the vehicles 104a-104d (and/or other devices within a broadcast range of network 106, for example). In some examples, the alert source 108 may be included in or may form the network 106, such that the alert is transmitted or broadcast to the vehicles and/or other devices from the same computing system that generated the alert using data from the law enforcement agency.

FIG. 1B shows an example response to the alert from vehicle 104b. It is to be understood that, while only one vehicle is shown responding in the example of FIG. 1B for illustrative purposes, any vehicle that includes an automatic alert processing system may respond to the alert in a similar manner to vehicle 104b. As shown, a response to the alert may include performing an automated scan for information regarding objects in a vicinity of the vehicle that received the alert. In the illustrated example, vehicle 104b is shown detecting objects in a scan region 110 in front of the vehicle. In other examples (or at a later time period in the illustrated example), any or all of the sensors on vehicle 104b may be used to scan an environment of the vehicle (e.g., side cameras to cover left and right side scan regions and rear cameras to cover a rear scan region). An automatic alert processing system of vehicle 104b may engage any front-facing cameras or other scanning devices in the vehicle to begin scanning for vehicles or individuals that match information provided in a received alert. In some examples, each engaged scanning device may continuously scan the environment simultaneously. In other examples, at least some of the scanning devices may scan the environment in periodic and/or alternating shifts.

In the illustrated example, the scan region 110 includes individual 105b and at least portions of vehicles 104c and 104d. Accordingly, the automatic alert processing system of vehicle 104b may analyze data from the scanning devices covering the scan region 110 (e.g., front cameras) to identify the individuals and vehicles and compare features of the individuals and vehicles to information from the received alert. For example, once individual 105b is identified as an individual, characteristics such as hair color, clothing, and size of the individual may be compared to information in the alert to identify any matches. Likewise, once vehicles 104c and 104d are identified as vehicles, characteristics such as make/model, color, and license plate of the vehicles may be compared to information in the alert to identify any matches. In this way, at least some different characteristics may be evaluated for different classes of objects (e.g., vehicle-targeted characteristics versus individual-targeted characteristics). It is to be understood that evaluating a vehicle may also include evaluating individual-targeted characteristics of any individuals inside the vehicle. In some examples, only characteristics that are described in the alert are examined (e.g., if the alert identifies a hair color of the individual but not the clothing of the individual, only hair color of individual 105b, and not clothing, may be evaluated by the automatic alert processing system of vehicle 104b). In other examples, all characteristics of an individual or vehicle may be evaluated, but only characteristics that are described in the alert are identified for comparison to the alert.

FIG. 1C shows an example response to performing the scanning operation in scan region 110. As illustrated, vehicle 104b may communicate with the alert source 108 or associated system (e.g., a law enforcement computing system) directly or via network 106 to provide information regarding the scanning operation. For example, if one or more of individual 105b, vehicle 104c, and vehicle 104d include features that match information from the received alert, vehicle 104b may transmit information regarding that individual and/or vehicle(s), the matched features, the location of the individual/vehicle(s), and/or any other associated information to the law enforcement agency or other computing system (e.g., the alert may identify a computing system to which responses to the alert are to be sent). In some examples, the response to the alert is sent to the same system that generated the alert (e.g., the alert source 108). In other examples, the response to the alert is sent to a different system (e.g., a third-party receiver in communication with appropriate authorities to filter or otherwise process the responses).

Figure 2:
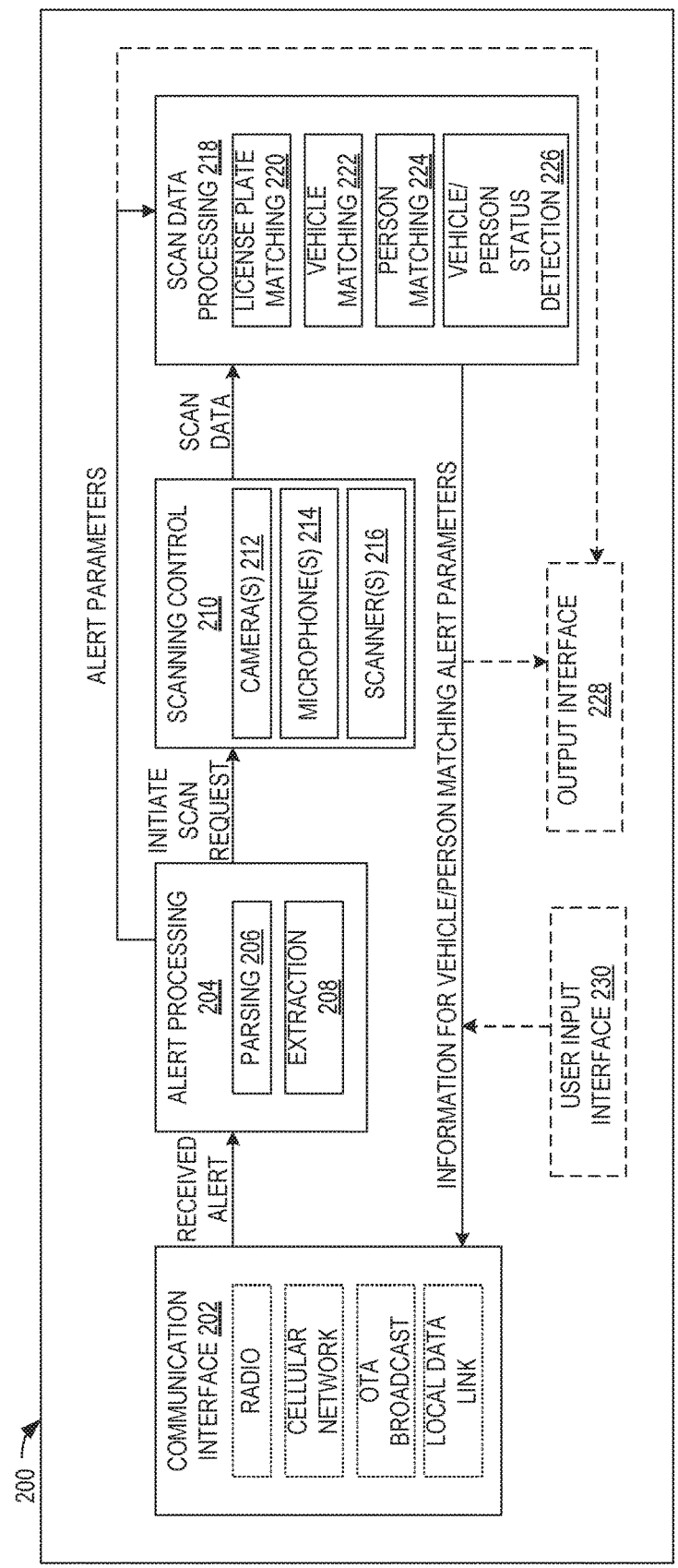
FIG. 2 shows a block diagram of an example automatic alert processing system and an associated example processing flow in accordance with one or more embodiments of the present disclosure.

FIG. 2 shows an example block diagram of an automatic alert processing system 200 and an example processing flow between components of the automatic alert processing system. The automatic alert processing system 200 may be included in any suitable vehicle, including but not limited to the vehicles of FIGS. 1A-1C (e.g., vehicle 104b). The automatic alert processing system 200 includes a communication interface 202 that is configured to receive emergency alerts (e.g., AMBER alerts) from one or more alert systems. For example, communication interface 202 may be a hardware interface including or coupled to physical receivers or transceivers (e.g., antennas) to connect the automatic alert processing system 200 to one or more radio transmitters/transceivers, cellular networks, over-the-air (OTA) broadcast transmitters, local data links (e.g., vehicle-to-vehicle communication links, mobile phone-to-vehicle communication links, etc.), and/or other communication links or networks. The communication interface 202 may receive emergency alerts over any one or combination of the above-described communication networks/links. For example, the communication interface 202 may receive an alert via a radio transmission (e.g., embedded in radio broadcasts according to the Radio Data System [RDS] or similar protocol, XFM data channels, specialized mobile radio service [SMRs], etc.), via an SMS text-based system (e.g., directly or through a local data link with a mobile device of a driver or other vehicle occupant), and/or via a cellular broadcast (e.g., according to the Wireless Emergency Alert program or Commercial Mobile Alert System). It is to be understood that alerts may also be received by the system in other manners, such as via user input and/or detected via vehicle scanning devices (e.g., an imaging device that captures an image of a billboard or other roadside sign with an AMBER alert printed or displayed thereon). In some examples, different alert sources may include different amounts and types of information for the same alert. Accordingly, some alerts may be processed in coordination with one another (e.g., whereby multiple alerts received from different sources but relating to the same suspect/individual in danger may be processed together) and alerts may be processed differently based on which path the alert travels (e.g., between the alert source and the vehicle). For example, scanning regions and/or alert parameters that are selected for matching scanned data may be selected based on a data path from which the alert is received.

Received alerts are passed to an alert processing unit 204, which may be implemented via a processor executing instructions stored in a storage device (e.g., memory). The alert processing unit 204 may include one or more parsing modules 206 and data extraction modules 208 for formatting and/or interpreting the data of the received alerts. For example, alerts may include text data indicating a description of one or more suspects, individuals in danger, and associated vehicles. The parsing modules 206 may recognize a context of the textual information (e.g., which portions of text relate to an individual in danger, which relate to a suspect, which relate to a vehicle, etc.). The extraction modules may extract parameters of the alert from the textual information (e.g., "red shirt," "brown hair," "123 456") for association with a vehicle or person described in the alert (e.g., "red shirt" is associated with a suspect, "brown hair" is associated with an individual in danger, and "123 456" is associated with a license plate of a vehicle). In this way, the alert processing unit 204 may provide parameters for matching detected objects in an environment with descriptions included in a received alert.

Once the alert is received and/or processed by processing unit 204, the processing unit may instruct a scanning control unit 210 to initiate a scan via a scan initiation request. The scanning control unit 210 may include and/or control one or more cameras 212 (e.g., vehicle cameras that are mounted on the vehicle and/or cameras of a device that is connected to the vehicle, such as a mobile phone camera), microphones 214, and/or other scanners 216 (e.g., optical scanners such as LiDAR scanners, electromagnetic scanners such as radar scanners, and/or sound-based scanners such as sonar scanners). The scanning control unit 210 may select one or more of the associated scanners based on a content of the alert (e.g., if all of the information in the alert is visually-based, the scanning control unit 210 may instruct only optical cameras/scanners to perform scans of the environment of the vehicle). In some examples, targeted areas of the scans may be based on the content of the alert and/or information from other sources regarding the alert. For example, the alert processing system 200 may receive notice from another vehicle (e.g., via the communication interface 202) that a scanned vehicle matching the suspect vehicle identified in the alert was identified at a first location and headed east toward the vehicle in which alert processing system 200 is included. In response, the scanning control unit 210 may instruct only cameras on the west side of the vehicle to scan for the suspect vehicle, since the suspect vehicle is likely to be approaching from that direction. Targeting the scan in this manner may conserve resources and reduce false positive recognitions, resulting in a more efficient and accurate scanning process compared to scans utilize all available scanning devices.

In other examples, all available scanning devices may be used in order to cover a larger area than a targeted scan. Such wide-range scan examples may increase the number of alert-matching features that are detected during scanning relative to the above-described targeted scanning, since a larger region of coverage provides more candidates for matching features. The wide-range scan may be utilized when a targeted vehicle or suspect is erratic and/or is otherwise not likely to follow a logic path toward the vehicle performing the scan.

The scan data from a scanning operation may be sent to a scan data processing unit 218 along with the alert parameters derived from the alert processing unit 204. For example, the scan data may include raw data output from one or more of the above-described scanning devices (e.g., images from cameras 212, audio from microphones 214, depth imaging data or other scan data from other scanners 216, etc.). The scan data processing unit 218 may include one or more modules for analyzing the received scan data, extracting features for comparison to alert parameters received from alert processing unit 204, and determining whether the extracted features match the alert parameters. For example, the scan data processing unit 218 may include a license plate matching module 220 for performing object recognition on the scan data to identify a license plate in the environment and text/character recognition on the scan data to recognize an identifier of the license plate (e.g., a license plate number and/or state/province/municipality) for matching a target license plate identifier included in the alert parameters.

The scan data processing unit 218 may also include a vehicle matching module 222 for recognizing vehicles in the scan data (e.g., performing object recognition to identify vehicles or vehicle components), determining features of recognized vehicles, and determining if features of the recognized vehicles match alert parameters from the alert processing unit 204. Similarly, a person matching module 224 of the scan data processing unit may recognize individuals in the scan data (e.g., performing object recognition to identify humans or human body parts), determining features of the recognized individuals, and determining if the features of the recognized individuals match alert parameters from the alert processing unit 204.

A vehicle and/or person status detection module 226 may also be included in the scan data processing unit 218. The vehicle and/or person status detection module may detect additional contextual information regarding vehicles and/or individuals identified as matching one or more of the alert parameters. For example, the vehicle and/or person status detection module may utilize scan data and/or data from other sensors to determine a heading, speed of movement, and/or other state of a vehicle or individual that matches the alert parameter(s). For example, a vehicle matching an alert parameter may be parked with a flat tire. Providing information regarding not only the location of the vehicle but also the parked with flat tire status may help authorities attempting to locate a suspect associated with the vehicle (e.g., by identifying that the suspect likely abandoned the vehicle and is now in a different vehicle).

The information gathered and analyzed with the scan data processing unit 218 may be provided to the communication interface 202 for transmission to a third party system that handles incoming alert responses and/or a law enforcement agency or other associated authority. As illustrated, the automatic alert processing system may optionally include an output interface 228 for providing, to a user, information regarding the alert and/or the analyzed scan data matching alert parameters. For example, the output interface 228 may be coupled to an in-vehicle display or other output device for notifying a driver or other occupant of information relevant to the alert. The automatic alert processing system may also optionally include a user input interface 230 for receiving data from a user input device (e.g., a touch screen in the vehicle or a microphone in the vehicle) relating to the alert.

For example, a user may (e.g., after receiving information regarding the alert via the output interface 228) recognize a vehicle or individual matching a parameter of the alert and provide an indication of this recognition to the automatic alert processing system for transmission to the third party system that handles incoming alert responses. In another example, a user may (e.g., after receiving information regarding the vehicle/individual matching the alert parameters according to the scan data processing unit 218) provide additional details regarding the matched vehicle/individual (e.g., a status of the vehicle/individual, as discussed above) and/or confirm or refute/edit the findings of the scan data processing unit. In this way, an overall distraction of the user may be reduced while still allowing the user to contribute to the alert response. Furthermore, the user input interface may enable passengers who are not preoccupied with driving tasks assist the automatic alert processing system by providing the above-described user inputs to enhance the output of the scan data processing unit 218. The number and/or type of alert parameters displayed on the output interface 228, when employed, may be kept to a minimum (e.g., color, make, and model of the car, gender of the driver, etc.) in order to minimize the distraction provided to the driver. In some examples, the alert parameters may only be provided to an output device that is directed to a passenger and/or to a separate mobile device of a passenger in order to avoid distracting the driver. If a user finds a match to one of the few parameters displayed, the user may provide the indication of the match to the system in order to direct the system to scan and process additional information about the target identified by the user. In this way, the user input regarding the alert may be provided to an alert service and/or may be used to further control the automatic processing of the alert by the vehicle.

Figure 3:
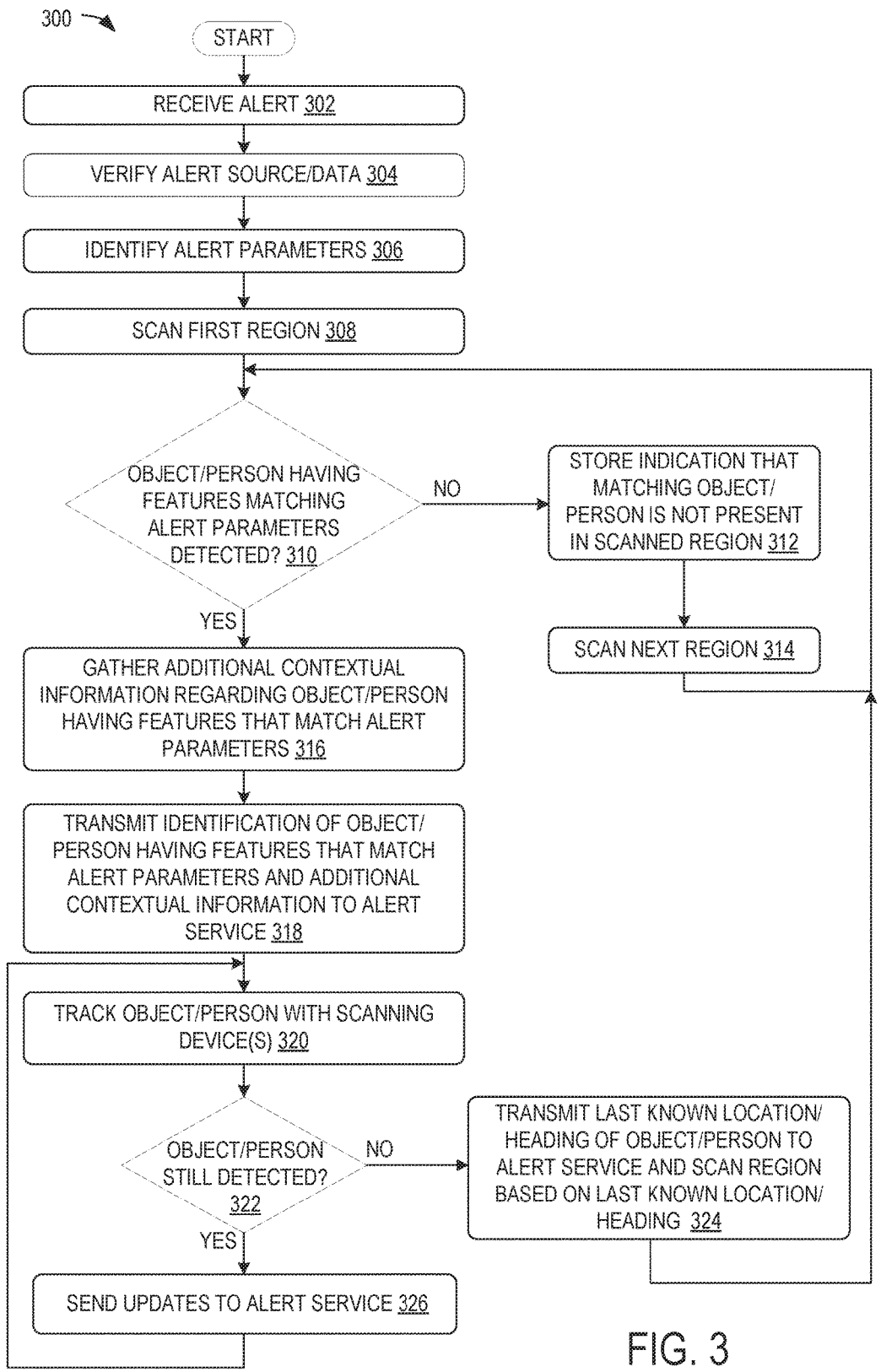
FIG. 3 shows a flow chart of an example method for automatically processing an emergency alert in accordance with one or more embodiments of the present disclosure.

FIG. 3 is a flow chart of an example method 300 for automatically processing an emergency alert using an automatic alert processing system (e.g., alert processing system 200 of FIG. 2). At 302, the method includes receiving an alert (e.g., an alert indicating a suspect, individual in danger, and/or other person of interest and/or associated vehicle). At 304, the method includes verifying the alert source and/or data in the alert. For example, a blockchain may be used to validate information arriving at a vehicle as authentic. Additional or alternative authentication schemes may be used to secure communications between the vehicle and an alert source, including security protocols built into the communication protocol utilized by the vehicle and alert source (e.g., Internet Protocol [IP], BLUETOOTH, WIFI) and suitable encryption (e.g., prefix-preserving encryption [PPE]).

At 306, the method includes identifying the alert parameters (e.g., for alerts that are verified at 304). For example, alert parameters may include types of objects for which the vehicle is to scan (e.g., persons of interest, vehicles, etc.) and features of the objects for which the vehicle is to scan (e.g., appearance of persons/vehicles—such as hair, clothing, height, weight, age, race, and tattoos/scars of persons and color, make, model, year, license plate, accessories, and condition of vehicles). Other information included in the alert may provide parameters to target scanning, such as a last known location/heading/speed or an expected location of the objects for which the vehicle is to scan.

At 308, the method includes scanning a first region of an environment around a vehicle using one or more scanning devices (e.g., 2D and/or 3D/depth cameras). The first region may refer to an area relative to the vehicle (e.g., a cone in front of the vehicle, an area around the circumference of the vehicle radiating outward a particular distance from the vehicle, etc.). In some examples, the first region may be a full range of operation (e.g., field of view and/or range in which objects are able to be detected) of the one or more scanning devices used for scanning. In other examples, the first region may be a subset of the full range of operation of the one or more scanning devices (or, where two or more scanning devices are used, the first region may be a full range of operation of a subset of the two or more scanning devices that are used for scanning).

At 310, the method includes determining if an object and/or person having features matching the alert parameters is detected. If an object and/or person having features matching the alert parameters is not detected (e.g., "NO" at 310), the method proceeds to 312 to store an indication that a matching object/person is not present in the scanned region. The indication may be timestamped in order to track changes to this determination. The method further proceeds to 314 to scan a next region. In examples where the first region represents the full operation range of the one or more scanning devices used to scan the environment, the next region may be the same region (relative to the vehicle) at a different point in time (e.g., at a different range of world locations than the first region if the vehicle is moving). After scanning the next region, the method returns to 310 to determine if an object/person having features matching the alert parameters is detected. The method may be exited if the vehicle leaves a range of coverage of the alert without detecting the object/person of interest for at least a threshold period of time.

If an object/person having features that match the alert parameters is detected (e.g., "YES" at 310), the method proceeds to 316 and includes gathering additional contextual information regarding the object and/or person having features that match the alert parameters. For example, the location (e.g., geotag), time of recognition (e.g., timestamp), heading, speed, percentage of match, terrain, neighboring vehicles/landmarks, and/or other contextual information for the matching object and/or person may be determined using the scanning devices and/or other sensors/devices of the vehicle. At 318, the method includes transmitting an identification of the object and/or person having features that match the alert parameters and the additional contextual information to an alert service. The alert service may be a central computing system to which responses to a given alert may be transmitted for analysis. The alert service may aggregate data from the responses in order to verify potential detections of an object and/or person(s) of interest and pass along information from the alert responses to associated authorities.

The driver and/or other occupants of the vehicle may provide user input to set user preferences controlling the manner in which data is shared with the alert service. For example, a user may provide privacy settings controlling an amount of information about the driver/vehicle that is provided to the alert service with an alert response. In some examples, a user may select an option to remain anonymous when sending an alert response. In other examples, a user may select an option to provide a phone number or other contact information when sending an alert response to enable the alert service or authorities associated with the alert contact the user to request further information. User preferences may also be set to control in which alert systems the user wishes to participate (e.g., AMBER alerts, stolen vehicle alerts, etc.).

At 320, the method includes tracking the object/person having features that match alert parameters with the scanning devices. For example, the object/person may be monitored over time to track movements of the object/person. From the movements, a heading and/or speed of the object/person may be determined. At 322, the method includes determining if the object/person is still detected by the scanning devices. If the object/person is not still detected (e.g., "NO" at 322), the method proceeds to 324 to transmit a last known location and/or heading/speed of the object/person to the alert service, and also to scan a region selected based on the last known location/heading. The method may then return to 310 to determine if the object/person is once again detected. If the object/person is still detected at 322 (e.g., "YES" at 322), the method includes sending updates to the alert service at 326 (e.g., regarding a changing location of the object/person), then returning to continue tracking the object/person with the scanning device(s).

Figure 4:
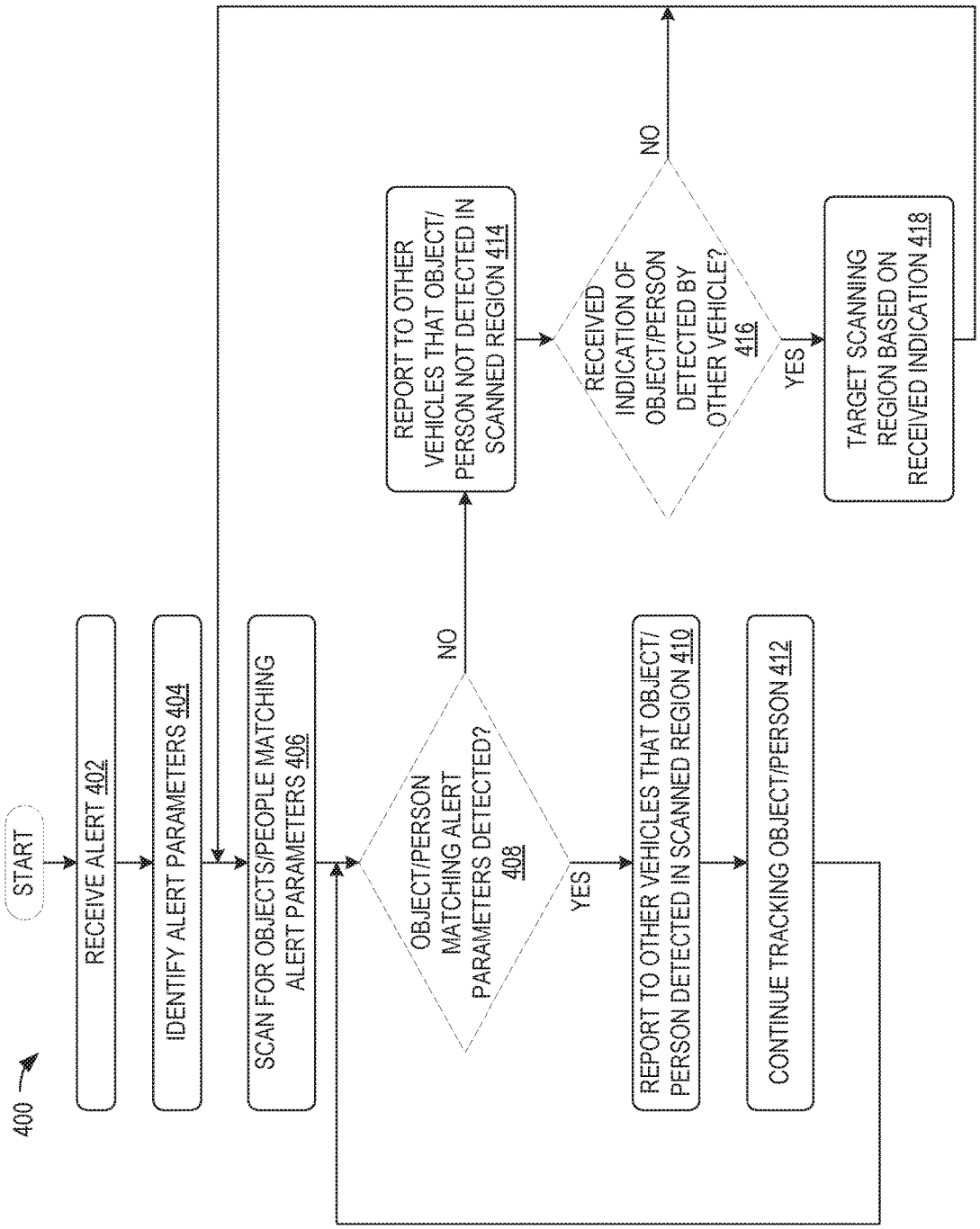
FIG. 4 shows a flow chart of an example method for group-based processing of an emergency alert in accordance with one or more embodiments of the present disclosure.

FIG. 4 is a flow chart of an example method for group-based processing of an emergency alert using automatic alert processing systems (e.g., examples of alert processing system 200 of FIG. 2) in multiple connected vehicles. Method 400 may be performed by an automatic alert processing system (e.g., alert processing system 200 of FIG. 2) in one of a plurality of vehicles including such an alert processing system (e.g., vehicle 104b of FIGS. 1A-1C). At 402, the method includes receiving an alert. At 404, the method includes identifying alert parameters. For example, the description of receiving an alert and identifying alert parameters provided for operations 302-306 of method 300 of FIG. 3 may apply to the operations 402 and 404. Method 400 further includes scanning for objects and/or people matching the alert parameters. The description of scanning for objects/people provided for operation 308 of method 300 of FIG. 3 may apply to the operation 406 of method 400.

At 408, the method includes determining if an object and/or person matching the alert parameters is detected. If an object and/or person matching the alert parameters is detected (e.g., "YES" at 408), the method proceeds to 410 and includes reporting to other vehicles (e.g., via vehicle-to-vehicle communication) within a threshold distance of the vehicle performing method 400 that the object and/or person is detected in the scanned region. The report may include an indication of the object/person that was detected, features of the object/person that were detected (e.g., features that match the alert parameters and/or additional features that are not included in the alert parameters, which may further assist other vehicles in locating the object/person), a location of the object/person (e.g., relative to the vehicle that detected the matching object/person and/or a location converted into real-world coordinates using known correspondences between vehicle-based sensors and the real-world coordinate system), a time of detecting the object/person, and/or other information. At 412, the method includes continuing to track the object/person and returning to 408 to determine if the object/person is still detected.

If an object/person matching the alert parameters is not detected (e.g., "NO" at 408), the method proceeds to 414 to report to the other vehicles that the object/person is not detected in the scanned region. At 416, the method includes determining if the alert processing system receives (e.g., from another vehicle, via vehicle-to-vehicle communication) an indication of an object/person detected by another vehicle. If the alert processing system does not receive an indication of an object/person detected by another vehicle (e.g., "NO" at 416), the method returns to 406 to continue scanning for objects/people that match the alert parameters. If the alert processing system does receive an indication of an object/person detected by another vehicle (e.g., "YES" at 416), the method includes targeting a scanning region based on the received indication at 418 and returning to 406 to scan for objects/people matching the alert parameters (e.g., in the targeted scanning region). In this way, information from surrounding vehicles may be used to coordinate scanning amongst the neighboring vehicles.

Figure 5:
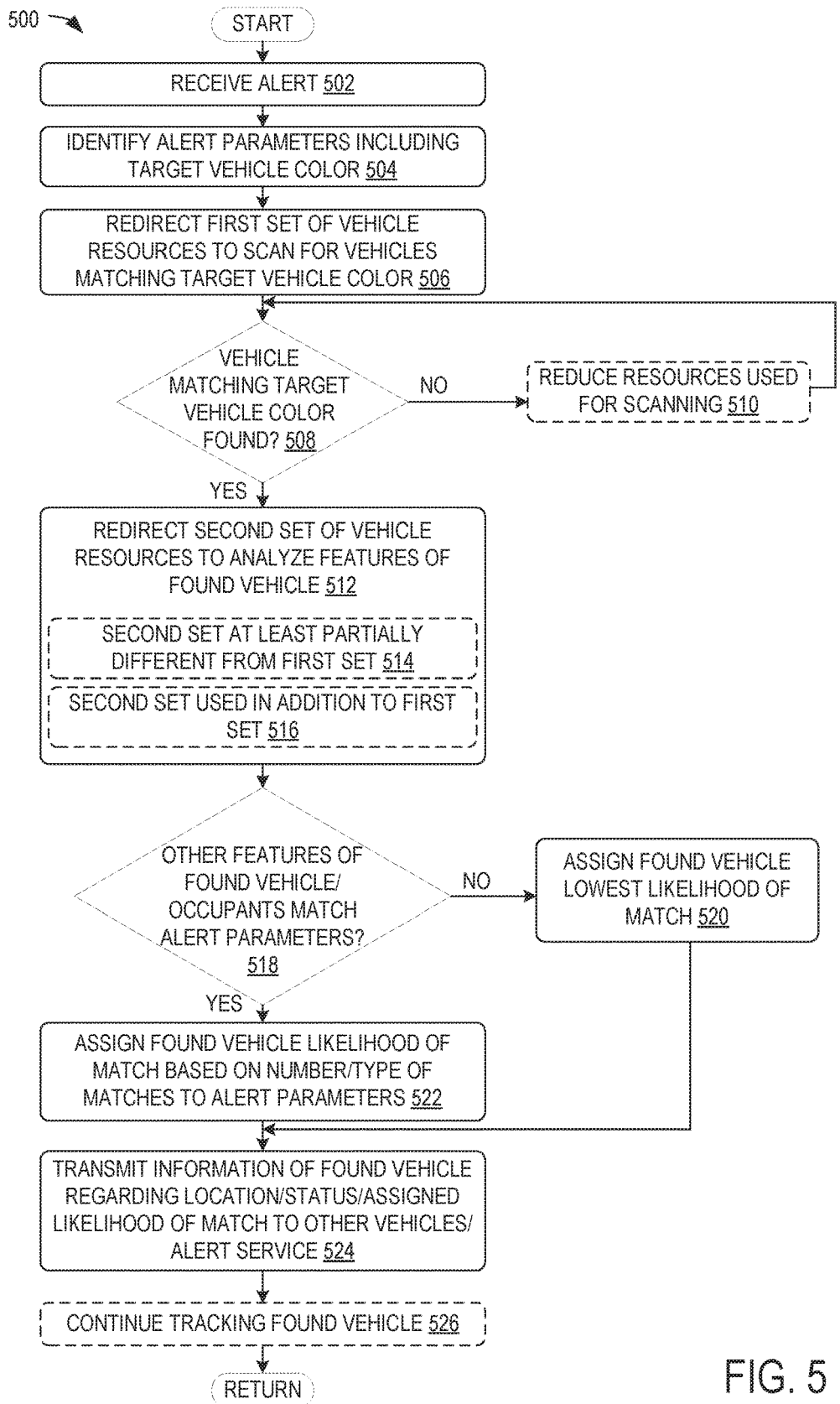
FIG. 5 is a flow chart of an example method for distributing computing loads responsive to receipt of an emergency alert in accordance with one or more embodiments of the present disclosure.

FIG. 5 is a flow chart of an example method for distributing computing loads within one or more vehicle computing systems responsive to receipt of an emergency alert at an alert processing system of the vehicle. Method 500 may be performed by an automatic alert processing system (e.g., alert processing system 200 of FIG. 2) of a vehicle (e.g., vehicle 104b of FIGS. 1A-1C). At 502, the method includes receiving an alert. At 504, the method includes identifying alert parameters including a target vehicle color. For example, the description of receiving an alert and identifying alert parameters provided for operations 302-306 of method 300 of FIG. 3 may apply to the operations 502 and 504. In the example method of 500, a target vehicle color is referenced as an alert parameter included in the alert. However, it is to be understood that the operations of method 500 that reference a vehicle color may be performed using any one or more alert parameters of a received alert in addition to the vehicle color or as an alternative to the vehicle color.

At 506, the method includes redirecting a first set of vehicle resources to scan for vehicles matching the target vehicle color. For example, a first set of vehicle resources may include a first subset of cameras or other scanning devices (which may include some or all of the cameras/scanning devices mounted on the vehicle or otherwise available for use by the vehicle) and/or a portion of processing resources (e.g., processing cores, processing logic units, memory, etc.). Redirection of the resources may include altering the operation of the devices, such as switching the devices from off to on and/or switching processing resources from dormant to active, changing a directionality or other scanning parameter of cameras/scanning devices, cancelling or holding some processing tasks to prioritize processing of scan data, etc. In some examples, current usage of at least some of the first set of vehicle resources (e.g., usage prior to the redirection of resources) may be maintained while still using the resources for scanning operations. For example, cameras that are used for providing a surround view of a vehicle to an in-vehicle display may still provide the surround view, but captured data may also be forwarded to processing modules for analyzing the captured data to scan for vehicles matching the alert parameters.

At 508, the method includes determining if a vehicle matching the target vehicle color is found. If a vehicle matching the target vehicle color is not found (e.g., "NO" at 508), the method optionally includes reducing resources used for scanning, as indicated at 510, and returns to continue scanning for a vehicle matching the target vehicle color. In some examples, resources used for scanning may be reduced by a set amount each time a vehicle that matches the target vehicle color is not found, until insufficient resources are available for performing the scanning operation, at which point the method returns to wait for a new alert. In other examples, the resources used for scanning may be reduced up to a minimum amount in order to enable the system to continue scanning until a vehicle matching the target vehicle color is found or the vehicle leaves a region associated with the alert (e.g., a region in which the alert was broadcast) or otherwise encounters a stop scanning condition (e.g., the vehicle shuts off, a user stops the scanning, etc.). The first set of vehicle resources and/or the way in which resources are reduced may be selected by user preference and/or selected based on a parameter of the alert (e.g., an urgency of the alert, the presence of reports from neighboring vehicles that responded to the alert, etc.).

If a vehicle matching the target vehicle color is found (e.g., "YES" at 508), the method includes redirecting a second set of vehicle resources to analyze features of the found vehicle, as indicated at 512. The second set may be at least partially different from the first set, as indicated at 514, and/or the second set may be used in addition to the first set, as indicated at 516. In either case, the second set of resources may be larger than the first set of resources. In some examples, the first set of vehicle resources may include more camera/scanning device resources than the second set of vehicle resources, while the second set of vehicle resources may include more processing resources than the first set of vehicle resources. In this way, at a first stage, a large amount of scanning data may be captured for a large area around the vehicle, and a minimal amount of processing may be performed on the data to quickly locate vehicles matching a first alert parameter (e.g., a vehicle color). At a second stage, the scanning resources may be targeted at a found vehicle (or at each found vehicle if multiple vehicles matching the target vehicle color are detected) and additional processing resources may be applied to derive additional details of the found vehicle(s) (e.g., performing license plate scanning, identifying occupants of the vehicle(s), identifying location, speed, heading, appearance, and/or other features of the vehicle(s), etc.).

At 518, the method includes determining if other features of the found vehicle and/or associated occupants match the alert parameters. If other features matching the alert parameters are not detected (e.g., "NO" at 518), the method includes assigning the found vehicle a lowest likelihood of a match (e.g., a lowest confidence score) at 520. If other features matching the alert parameters are detected (e.g., "YES" at 518), the method includes assigning the found vehicle a likelihood of a match (e.g., a confidence score) that is based on a number and/or type of matches to the alert parameters, as indicated at 522. For example, some alert parameters may be weighed more heavily than others (e.g., license plate parameters may be weighed more heavily than vehicle type, since there may be many vehicles of the same type on the road, but license plates are configured to be unique), such that heavily-weighted parameters increase a likelihood/confidence score more than other, less heavily-weighted parameters. The likelihood/confidence score may also reflect a confidence in the analysis of scan data that lead to the determination of a match for each alert parameter.

At 524, the method includes transmitting information of the found vehicle including a location, status, and/or assigned likelihood of a match (e.g., confidence score) to other, neighboring vehicles and/or to an alert service. At 526, the method optionally includes continuing to track the found vehicle. In some examples, the found vehicle may be tracked using fewer resources than those used for detecting whether the found vehicle matches alert parameters. In other examples, the found vehicle may be tracked using the same or additional resources than those used for detecting whether the found vehicle matches alert parameters. In this way, the system may continuously adjust the likelihood/confidence score based on ongoing tracking of the vehicle.

The disclosed methods and systems automatically process and respond to incoming alerts, such as AMBER alerts, using vehicle systems in order to attempt to locate objects and/or people described in the alerts. A technical effect of the disclosed methods and systems is that efficiency and accuracy of responding to received alerts is increased relative to systems in which alerts are presented to a user and responses are generated based only on user input. Vehicle scanning and processing resource redirection, as described with respect to FIG. 5, may also improve the functioning of the vehicle systems by balancing processing and scanning loads according to priority assignments. Further resource savings may be achieved by leveraging information from neighboring vehicles to target scanning and data processing, as described with respect to FIG. 4.

Figure 6:
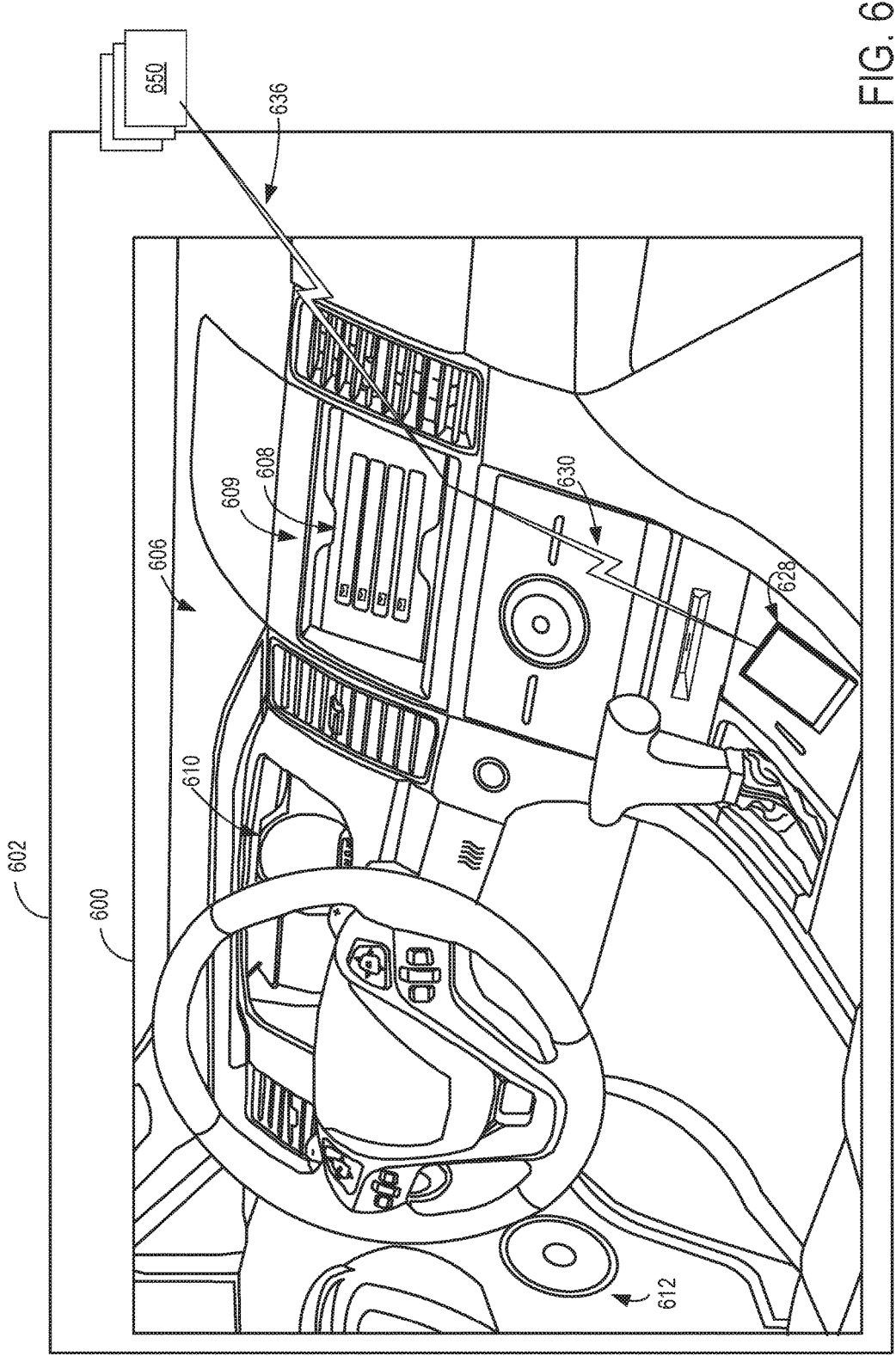
FIG. 6 shows an example partial view of a vehicle cabin in accordance with one or more embodiments of the present disclosure.

As described above, the example methods may be performed, at least in part, within a vehicle using scanning systems and processing resources of the vehicle. FIG. 6 shows an example partial view of one type of environment for an automatic alert processing system: an interior of a cabin 600 of a vehicle 602, in which a driver and/or one or more passengers may be seated. FIG. 6 may be an example of one or more of vehicles 104a-104d of FIG. 1.

As shown, an instrument panel 606 may include various displays and controls accessible to a driver (also referred to as the user) of vehicle 602. For example, instrument panel 606 may include a touch screen 608 of an in-vehicle computing system 609 (e.g., an infotainment system), an audio system control panel, and an instrument cluster 610. In some embodiments, one or more hardware elements of in-vehicle computing system 609, such as touch screen 608, a display screen, various control dials, knobs and buttons, memory, processor(s), and any interface elements (e.g., connectors or ports) may form an integrated head unit that is installed in instrument panel 606 of the vehicle. The head unit may be fixedly or removably attached in instrument panel 606. In additional or alternative embodiments, one or more hardware elements of the in-vehicle computing system may be modular and may be installed in multiple locations of the vehicle.

The cabin 600 may include one or more sensors for monitoring the vehicle, the user, and/or the environment. For example, the cabin 600 may include one or more microphones to receive user input in the form of voice commands and/or to measure ambient noise in the cabin 600 or outside of the vehicle (e.g., to establish a noise baseline for separating siren sounds from environmental noise and/or to detect a siren sound), etc. Sensors for scanning the environment may include one or more cameras, LiDAR arrays, and/or other optical sensors for detecting features of the environment surrounding the vehicle. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 650 and/or mobile device 628.

Cabin 600 may also include one or more user objects, such as mobile device 628, that are stored in the vehicle before, during, and/or after travelling. The mobile device 628 may include a smart phone, a tablet, a laptop computer, a portable media player, and/or any suitable mobile computing device. The mobile device 628 may be connected to the in-vehicle computing system via communication link 630. The communication link 630 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 628 may include one or more wireless communication interfaces for connecting to one or more communication links. For example, the communication link 630 may provide sensor and/or control signals from various vehicle systems (such as vehicle audio system, sensor subsystem, etc.) and the touch screen 608 to the mobile device 628 and may provide control and/or display signals from the mobile device 628 to the in-vehicle systems and the touch screen 608. In some examples, the mobile device 628 may provide additional resources for performing scanning operations (e.g., for scanning and/or for processing scanned data) and/or for negotiating between vehicles (e.g., for negotiating communication parameters or master vehicle designations between vehicles).

In-vehicle computing system 609 may also be communicatively coupled to additional devices operated and/or accessed by the user but located external to vehicle 602, such as one or more external devices 650. In the depicted embodiment, external devices are located outside of vehicle 602 though it will be appreciated that in alternate embodiments, external devices may be located inside cabin 600. The external devices may include a server computing system, personal computing system, portable electronic device, electronic wrist band, electronic head band, portable music player, electronic activity tracking device, pedometer, smartwatch, GPS system, etc. External devices 650 may be connected to the in-vehicle computing system via communication link 636 which may be wired or wireless, as discussed with reference to communication link 630, and configured to provide two-way communication between the external devices and the in-vehicle computing system. For example, external devices 650 may include one or more sensors and communication link 636 may transmit sensor output from external devices 650 to in-vehicle computing system 609 and touch screen 608.

In-vehicle computing system 609 may analyze the input received from external devices 650, mobile device 628, and/or other input sources and provide output via touch screen 608 and/or speakers 612, communicate with mobile device 628 and/or external devices 650, and/or perform other actions based on the assessment. In some embodiments, all or a portion of the assessment may be performed by the mobile device 628 and/or the external devices 650. In some embodiments, the external devices 650 may include in-vehicle computing devices of another vehicle (e.g., another vehicle grouped with vehicle 602).

Figure 7:
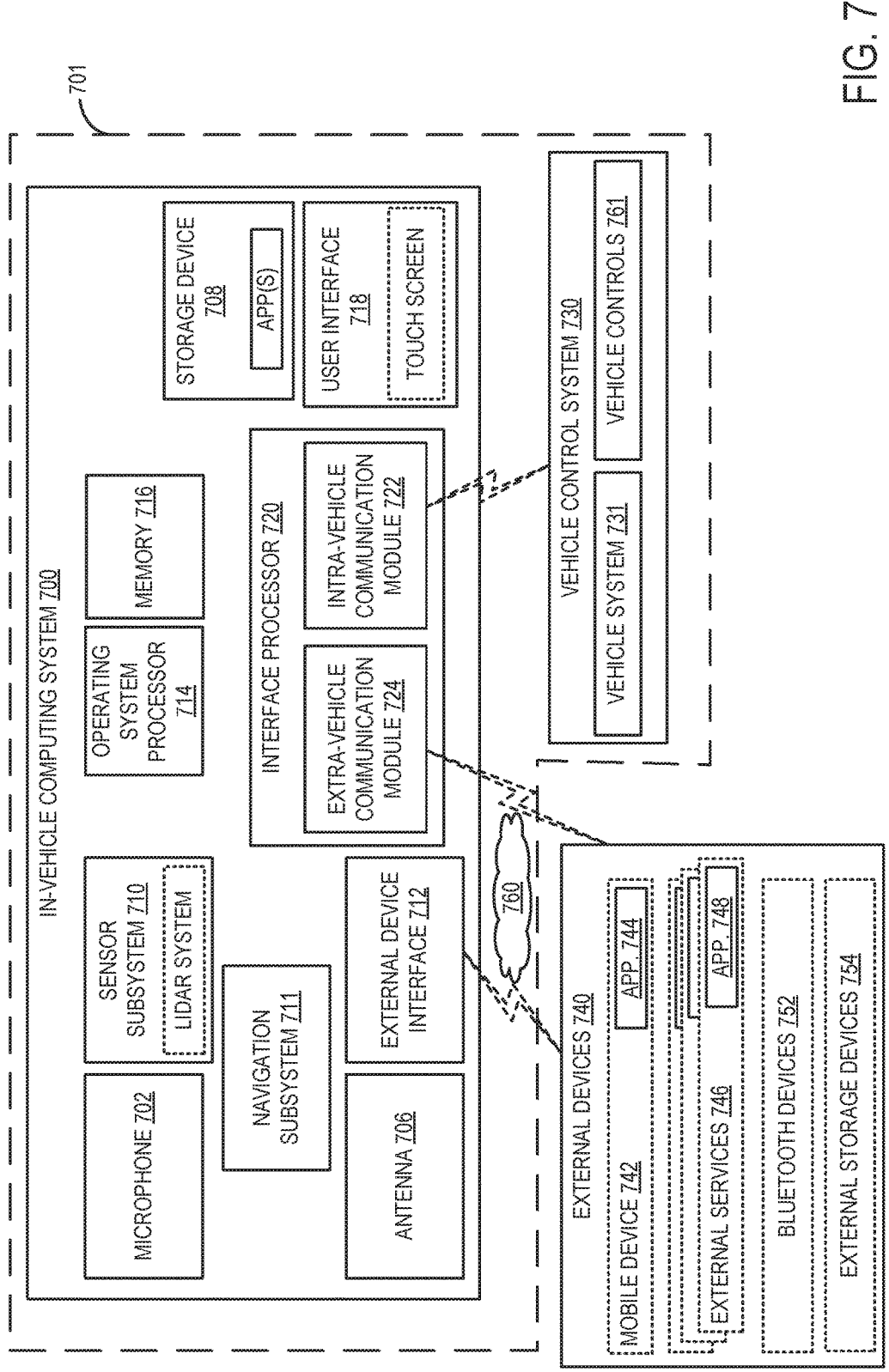
FIG. 7 shows a block diagram of an in-vehicle computing system in accordance with one or more embodiments of the present disclosure.

FIG. 7 shows a block diagram of an in-vehicle computing system 700 configured and/or integrated inside vehicle 701. In-vehicle computing system 700 may be an example of in-vehicle computing system 609 of FIG. 6 and/or may perform one or more of the methods described herein in some embodiments. In some examples, the in-vehicle computing system may be a vehicle infotainment system configured to provide information-based media content (audio and/or visual media content, including entertainment content, navigational services, map data, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 701 in order to enhance an in-vehicle experience for a driver and/or a passenger.

In-vehicle computing system 700 may include one or more processors including an operating system processor 714 and an interface processor 720. Operating system processor 714 may execute an operating system on the in-vehicle computing system, and control input/output, display, playback, and other operations of the in-vehicle computing system. Interface processor 720 may interface with a vehicle control system 730 via an intra-vehicle communication module 722.

Intra-vehicle communication module 722 may output data to other vehicle systems 731 and vehicle control elements 761, while also receiving data input from other vehicle components and systems 731, 761, e.g. by way of vehicle control system 730. When outputting data, intra-vehicle communication module 722 may provide a signal via a bus corresponding to any status of the vehicle, the vehicle surroundings (e.g., as measured by one or more microphones, cameras, LiDAR systems, or other sensors mounted on the vehicle), or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), and digital signals propagated through vehicle data networks (such as an engine controller area network [CAN] bus through which engine related information may be communicated and/or an audio-video bridging [AVB] network through which vehicle information may be communicated). For example, the in-vehicle computing system may retrieve from the engine CAN bus the current speed of the vehicle estimated by the wheel sensors, a current location of the vehicle provided by the GPS sensors, and a current trajectory of the vehicle provided by one or more inertial measurement sensors in order to determine an estimated path of the vehicle (e.g., for updating a display of the in-vehicle computing system). In addition, other interfacing protocols/hardware such as Ethernet or Bluetooth may be used as well without departing from the scope of this disclosure.

A non-volatile storage device 708 may be included in in-vehicle computing system 700 to store data such as instructions executable by processors 714 and 720 in non-volatile form. The storage device 708 may store application data to enable the in-vehicle computing system 700 to perform any of the above-described methods and/or to run an application for connecting to a cloud-based server and/or collecting information for transmission to the cloud-based server. Connection to a cloud-based server may be mediated via extra-vehicle communication module 724. The application may retrieve information gathered by vehicle systems/sensors, input devices (e.g., user interface 718), devices in communication with the in-vehicle computing system, etc. In-vehicle computing system 700 may further include a volatile memory 716. Volatile memory 716 may be random access memory (RAM). Non-transitory storage devices, such as non-volatile storage device 708 and/or volatile memory 716, may store instructions and/or code that, when executed by a processor (e.g., operating system processor 714 and/or interface processor 720), controls the in-vehicle computing system 700 to perform one or more of the actions described in the disclosure.

A microphone 702 may be included in the in-vehicle computing system 700 to measure ambient noise in the vehicle, to measure ambient noise outside the vehicle, etc. One or more additional sensors may be included in and/or communicatively coupled to a sensor subsystem 710 of the in-vehicle computing system 700. For example, the sensor subsystem 710 may include and/or be communicatively coupled to scanning sensors including a LiDAR system and/or a camera system (e.g., a rear view camera, a front view camera, side view cameras, LiDAR sensors disposed to cover a 360 degree area around the vehicle, etc.). Sensor subsystem 710 of in-vehicle computing system 700 may communicate with and receive inputs from various vehicle sensors and may further receive user inputs. While certain vehicle system sensors may communicate with sensor subsystem 710 alone, other sensors may communicate with both sensor subsystem 710 and vehicle control system 730, or may communicate with sensor subsystem 710 indirectly via vehicle control system 730. Sensor subsystem 710 may serve as an interface (e.g., a hardware interface) and/or processing unit for receiving and/or processing received signals from one or more of the sensors described in the disclosure.

A navigation subsystem 711 of in-vehicle computing system 700 may generate and/or receive navigation information such as location information (e.g., via a GPS sensor and/or other sensors from sensor subsystem 710), route guidance, traffic information, point-of-interest (POI) identification, and/or provide other navigational services for the driver. The navigation subsystem 711 may include an inertial navigation system that may further determine a position, orientation, and velocity of the vehicle via motion and rotation sensor inputs. The navigation subsystem 711 may communicate with motion and rotation sensors included in the sensor subsystem 710. Alternatively, the navigation subsystem 711 may include motion and rotation sensors and determine the movement and rotation based on the output of these sensors. Navigation subsystem 711 may transmit data to, and receive data from a cloud-based server and/or external navigation service via extra-vehicle communication module 724. The navigation subsystem 711 may provide at least a portion of data to be used during generation of a three-dimensional map of a region around the vehicle in some examples.

External device interface 712 of in-vehicle computing system 700 may be coupleable to and/or communicate with one or more external devices 740 located external to vehicle 701. While the external devices are illustrated as being located external to vehicle 701, it is to be understood that they may be temporarily housed in vehicle 701, such as when the user is operating the external devices while operating vehicle 701. In other words, the external devices 740 are not integral to vehicle 701. The external devices 740 may include a mobile device 742 (e.g., connected via a Bluetooth, NFC, WIFI direct, or other wireless connection) or an alternate Bluetooth-enabled device 752. Other external devices include external services 746. For example, the external devices may include extra-vehicular devices that are separate from and located externally to the vehicle. Still other external devices include external storage devices 754, such as solid-state drives, pen drives, USB drives, etc. External devices 740 may communicate with in-vehicle computing system 700 either wirelessly or via connectors without departing from the scope of this disclosure. For example, external devices 740 may communicate with in-vehicle computing system 700 through the external device interface 712 over network 760, a universal serial bus (USB) connection, a direct wired connection, a direct wireless connection, and/or other communication link.

One or more applications 744 may be operable on mobile device 742. As an example, mobile device application 744 may be operated to monitor an environment of the vehicle (e.g., collect audio and/or visual data of an environment of the vehicle) and/or to process audio and/or visual data received from vehicle sensors. The collected/processed data may be transferred by application 744 to external device interface 712 over network 760. Likewise, one or more applications 748 may be operable on external services 746. As an example, external services applications 748 may be operated to aggregate and/or analyze data from multiple data sources. For example, external services applications 748 may aggregate data from the in-vehicle computing system (e.g., sensor data, log files, user input, etc.), etc.

Vehicle control system 730 may include controls for controlling aspects of various vehicle systems 731 involved in different in-vehicle functions. Vehicle control system 730 may also include controls for adjusting the settings of various vehicle controls 761 (or vehicle system control elements) related to the engine and/or auxiliary elements within a cabin of the vehicle.

In-vehicle computing system 700 may further include an antenna(s) 706, which may be communicatively coupled to external device interface 712 and/or extra-vehicle-communication module 724. The in-vehicle computing system may receive positioning signals such as GPS signals and/or wireless commands via antenna(s) 706 or via infrared or other mechanisms through appropriate receiving devices.

One or more elements of the in-vehicle computing system 700 may be controlled by a user via user interface 718. User interface 718 may include a graphical user interface presented on a touch screen, such as touch screen 608 of FIG. 6, and/or user-actuated buttons, switches, knobs, dials, sliders, etc. For example, user-actuated elements may include steering wheel controls, door and/or window controls, instrument panel controls, navigation system settings, and the like. A user may also interact with one or more applications of the in-vehicle computing system 700 and mobile device 742 via user interface 718. Notifications and other messages (e.g., alerts), as well as navigational assistance (e.g., 3D maps), may be displayed to the user on a display of the user interface.

The disclosure provides for an in-vehicle computing system of a vehicle, the in-vehicle computing system including a sensor subsystem in communication with a sensor, a communication interface, a processor, and memory storing instructions executable by the processor to receive, via the communication interface, an alert including one or more alert parameters associated with one or more target objects, instruct the sensor to scan an assigned region around the vehicle, receive, from the sensor, locally scanned data corresponding to the assigned region, determine that the scanned data includes an object having features matching a selected alert parameter of the one or more alert parameters, and transmit, to an alert service, a notification identifying the object and the features matching the selected alert parameter, the notification including a location of the object. In a first example of the in-vehicle computing system, the alert may additionally or alternatively include an emergency alert. A second example of the in-vehicle computing system optionally includes the first example, and further includes the in-vehicle computing system, wherein the selected alert parameter includes a target color of a target vehicle. A third example of the in-vehicle computing system optionally includes one or both of the first and second examples, and further includes the in-vehicle computing system, wherein the instructions are further executable to redirect a first set of vehicle resources to determine that the scanned data includes a found vehicle having the target color, and to redirect a second set of vehicle resources to determine additional features of the found vehicle. A fourth example of the in-vehicle computing system optionally includes one or more of the first through the third examples, and further includes the in-vehicle computing system, wherein the first set of vehicle resources includes a first set of optical sensors scanning a first region around the vehicle, and the second set of vehicle resources includes a second set of optical sensors scanning a second region around the vehicle, the second region being smaller than the first region and selected based on a location of the found vehicle. A fifth example of the in-vehicle computing system optionally includes one or more of the first through the fourth examples, and further includes the in-vehicle computing system, wherein the first set of vehicle resources includes a first set of processing resources for performing color matching, and wherein the second set of vehicle resources includes a second, larger set of processing resources for detecting additional features of the found vehicle in addition to the target color. A sixth example of the in-vehicle computing system optionally includes one or more of the first through the fifth examples, and further includes the in-vehicle computing system, wherein the selected alert parameter includes one or more of a license plate identification and a vehicle make and/or model indicating a vehicle shape. A seventh example of the in-vehicle computing system optionally includes one or more of the first through the sixth examples, and further includes the in-vehicle computing system, wherein the selected alert parameter includes one or more features of a person of interest. An eighth example of the in-vehicle computing system optionally includes one or more of the first through the seventh examples, and further includes the in-vehicle computing system, wherein the instructions are further executable to transmit, to one or more neighboring vehicles, the notification identifying the object, the location of the object, and the features of the object matching the selected alert parameter. A ninth example of the in-vehicle computing system optionally includes one or more of the first through the eighth examples, and further includes the in-vehicle computing system, wherein the notification further includes a confidence score indicating a likelihood that the object matches one of the one or more target objects. A tenth example of the in-vehicle computing system optionally includes one or more of the first through the ninth examples, and further includes the in-vehicle computing system, wherein the instructions are further executable to receive, from one or more neighboring vehicles, a report indicating a reported location of a reported object matching the selected alert parameter, and wherein the assigned region around the vehicle is selected based on the reported location of the reported object as indicated in the report. An eleventh example of the in-vehicle computing system optionally includes one or more of the first through the tenth examples, and further includes the in-vehicle computing system, wherein the instructions are further executable to verify that the received alert is authentic before instructing the sensor to scan the assigned region, and before transmitting the notification to the alert service. A twelfth example of the in-vehicle computing system optionally includes one or more of the first through the eleventh examples, and further includes the in-vehicle computing system, wherein the instructions are further executable to determine additional contextual information regarding the object matching the selected alert parameter and transmit the additional contextual information with the notification. A thirteenth example of the in-vehicle computing system optionally includes one or more of the first through the twelfth examples, and further includes the in-vehicle computing system, wherein the additional contextual information includes one more of a heading of the object, a speed of the object, and a status of the object, and/or wherein the additional contextual information is derived using measurements from one or more additional sensors in communication with the sensor subsystem. A fourteenth example of the in-vehicle computing system optionally includes one or more of the first through the thirteenth examples, and further includes the in-vehicle computing system, wherein the one or more additional sensors includes one or more of a sonar array and a radar array. In this way, one or more of the alert parameters may be detected by a first sensor (e.g., an optical sensor, such as a LiDAR sensor) and the additional contextual information may be detected by a second, different sensor or sensor array (e.g., a sonar array and/or a radar array). A fifteenth example of the in-vehicle computing system optionally includes one or more of the first through the fourteenth examples, and further includes the in-vehicle computing system, wherein the additional contextual information includes one or more features of the object that are not associated with the one or more alert parameters. A sixteenth example of the in-vehicle computing system optionally includes one or more of the first through the fifteenth examples, and further includes the in-vehicle computing system, wherein the alert includes an America's Missing: Broadcast Emergency Response (AMBER) alert. A seventeenth example of the in-vehicle computing system optionally includes one or more of the first through the sixteenth examples, and further includes the in-vehicle computing system, wherein the sensor is an optical sensor.

The disclosure further provides for a method for responding to an incoming alert with an automatic alert processing system of a vehicle, the method including scanning an assigned region around a vehicle for an object matching one or more alert parameters of the incoming alert, the one or more alert parameters describing one or more target objects, and transmitting, to an alert service, a notification indicating a location of a found object that matches at least a selected parameter of the one or more alert parameters of the incoming alert, the notification including a confidence score indicating a likelihood that the found object matches one or more target objects of the incoming alert. In a first example of the method, the incoming alert may additionally or alternatively include an America's Missing: Broadcast Emergency Response (AMBER) alert received via one or more data paths. A second example of the method optionally includes the first example, and further includes the method, wherein the one or more data paths includes a broadcast transmission and a communication link between the vehicle and a mobile phone located in the vehicle, and wherein different alert parameters are provided on different data paths of the one or more data paths, the method including selecting the assigned region based on the one or more alert parameters.

The disclosure also provides for an in-vehicle computing system of a vehicle, the in-vehicle computing system including a sensor subsystem in communication with an optical sensor, a communication interface, a processor, and memory storing instructions executable by the processor to receive, via the communication interface, an alert including one or more alert parameters associated with one or more target objects, instruct the optical sensor to scan a first assigned region around the vehicle, determine, using a first set of processing resources, that scanned data corresponding to the first assigned region includes an object having features matching a selected alert parameter of the one or more alert parameters, instruct the optical sensor to scan a second assigned region around the vehicle, the second assigned region being smaller than the first assigned region and targeting the object, determine, using a second set of processing resources analyzing scanned data corresponding to the second assigned region, that the object has additional features matching one or more additional alert parameters of the one or more alert parameters, and transmit, to an alert service, a notification identifying the object and each of the features matching each associated alert parameter of the one or more alert parameters, the notification including a location of the object. In a first example of the in-vehicle computing system, the notification may additionally or alternatively further include an indication of a confidence score indicating a likelihood that the object matches at least one of the one or more target objects.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 609 of FIG. 6 and/or the sensor subsystem 710 of FIG. 7. The methods may be performed by executing stored instructions with one or more logic devices (e.g., processors) in combination with one or more additional hardware elements, such as storage devices, sensors, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system of a vehicle, the in-vehicle computing system comprising:
a sensor subsystem in communication with a sensor;
a communication interface;
a processor; and
memory storing instructions executable by the processor to:
receive, via the communication interface, an alert including one or more alert parameters associated with one or more target objects;
instruct the sensor to scan an assigned region around the vehicle;
receive, from the sensor, locally scanned data corresponding to the assigned region;
redirect a first subset of processing resources to monitor for objects matching a selected alert parameter of the one or more alert parameters in the locally scanned data;
in a first condition:
determine that the scanned data includes an object having a feature matching the selected alert parameter, redirect a second subset of processing resources to analyze and determine other features of the object, the second subset of processing resources being larger than the first subset of processing resources, assign a confidence score to the object indicating a likelihood of a match of the object to the one or more target objects based on a number and/or type of matches to the one or more alert parameters, and transmit, to an alert service, a notification identifying the object, the feature matching the selected alert parameter, and the confidence score, the notification including a location of the object; and in a second condition:
determine that the scanned data does not include any object having features matching the selected alert parameter, and monitor for objects matching the selected alert parameter of the one or more alert parameters in the locally scanned data using a reduced amount of processing resources from the first subset of processing resources.

2. The in-vehicle computing system of claim 1, wherein the alert includes an emergency alert.

3. The in-vehicle computing system of claim 2, wherein the selected alert parameter includes a target color of a target vehicle.

4. The in-vehicle computing system of claim 3, wherein the instructions are further executable to redirect a first set of vehicle resources to determine that the scanned data includes a found vehicle having the target color, and to redirect a second set of vehicle resources to determine additional features of the found vehicle.

5. The in-vehicle computing system of claim 4, wherein the first set of vehicle resources includes a first set of optical sensors scanning a first region around the vehicle, and the second set of vehicle resources includes a second set of optical sensors scanning a second region around the vehicle, the second region being smaller than the first region and selected based on a location of the found vehicle.

6. The in-vehicle computing system of claim 1, wherein the first subset of processing resources includes a first set of processing resources for performing color matching, and wherein the second subset of processing resources includes a second, larger set of processing resources for detecting additional features of a found vehicle in addition to a target color.

7. The in-vehicle computing system of claim 1, wherein the selected alert parameter includes one or more of a license plate identification and a vehicle make or model indicating a vehicle shape, and wherein a match to the license plate identification of the alert is weighed more heavily in a calculation of the confidence score than a match to the vehicle make or model of the alert.

8. The in-vehicle computing system of claim 1, wherein the selected alert parameter includes one or more features of a person of interest, and wherein the assigned region is selected based on an indication input from a user regarding a reported object matching at least one of the one or more alert parameters of the alert.

9. The in-vehicle computing system of claim 1, wherein the instructions are further executable to transmit, to one or more neighboring vehicles, the notification identifying the object, the location of the object, and the feature of the object matching the selected alert parameter.

10. The in-vehicle computing system of claim 9, wherein the notification further includes the confidence score indicating the likelihood that the object matches one of the one or more target objects.

11. The in-vehicle computing system of claim 1, wherein the instructions are further executable to receive, from one or more neighboring vehicles, a report indicating a reported location of a reported object matching the selected alert parameter, and wherein the assigned region around the vehicle is selected based on the reported location of the reported object as indicated in the report.

12. The in-vehicle computing system of claim 1, wherein the instructions are further executable to verify that the received alert is authentic before instructing the sensor to scan the assigned region, and before transmitting the notification to the alert service.

13. The in-vehicle computing system of claim 1, wherein the instructions are further executable to determine additional contextual information regarding the object matching the selected alert parameter and transmit the additional contextual information with the notification.

14. The in-vehicle computing system of claim 13, wherein the additional contextual information includes one more of a heading of the object, a speed of the object, and a status of the object, wherein the additional contextual information is derived using measurements from one or more additional sensors in communication with the sensor subsystem.

15. The in-vehicle computing system of claim 14, wherein the one or more additional sensors includes one or more of a sonar array and a radar array.

16. A method for responding to an incoming alert with an automatic alert processing system of a vehicle, the method comprising:

receiving, from one or more neighboring vehicles, a report indicating a reported location of a reported object identified by the one or more neighboring vehicles as matching one or more alert parameters of the incoming alert, the one or more alert parameters describing one or more target objects;

scanning an assigned region around the vehicle for an object matching at least a selected alert parameter of the one or more alert parameters of the incoming alert, the assigned region around the vehicle being selected based on the reported location of the reported object as indicated in the report;

receiving, from a sensor, data corresponding to the assigned region;

redirecting a first subset of processing resources to monitor for objects matching a selected alert parameter of the one or more alert parameters in the locally scanned data;

in a first condition:
determining that the scanned data includes the object having a feature matching the selected alert parameter, redirecting a second subset of processing resources to analyze and determine other features of the object, the second subset of processing resources being larger than the first subset of processing resources, assigning a confidence score to the object indicating a likelihood of a match of the object to the one or more target objects based on a number and/or type of matches to the one or more alert parameters, in a second condition:

determining that the scanned data does not include any object having features matching the selected alert parameter, and monitoring for objects matching the selected alert parameter of the one or more alert parameters in the locally scanned data using a reduced amount of processing resources from the first subset of processing resources; and transmitting, via a communication interface of the vehicle, a notification to an alert service, the notification indicating a location of a found object that matches at least the selected alert parameter of the one or more alert parameters of the incoming alert, the notification including a confidence score indicating a likelihood that the found object matches the one or more target objects of the incoming alert.

17. The method of claim 16, wherein the incoming alert includes an America's Missing: Broadcast Emergency Response (AMBER) alert received via one or more data paths.

18. The method of claim 17, wherein the one or more data paths includes a broadcast transmission and a communication link between the vehicle and a mobile phone located in the vehicle, and wherein different alert parameters are provided on different data paths of the one or more data paths, the method including selecting the assigned region based on the one or more alert parameters.

19. An in-vehicle computing system of a vehicle, the in-vehicle computing system comprising:

a sensor subsystem in communication with an optical sensor and one or more additional scanning devices;

a communication interface;

a processor; and memory storing instructions executable by the processor to:

receive, via the communication interface, an alert including one or more alert parameters associated with one or more target objects;

instruct a first subset of scanning resources of the sensor subsystem including the optical sensor to scan a first assigned region around the vehicle;

determine, using a first set of processing resources, that scanned data corresponding to the first assigned region includes an object having features matching a selected alert parameter of the one or more alert parameters;

instruct a second subset of scanning resources of the sensor subsystem to scan a second assigned region around the vehicle, the second assigned region being smaller than the first assigned region and targeting the object, and the second subset of scanning resources including fewer scanning devices than the first subset of scanning resources;

determine, using a second set of processing resources analyzing scanned data corresponding to the second assigned region, that the object has additional features matching one or more additional alert parameters of the one or more alert parameters, the second set of processing resources including more processing resources than the first set of processing resources; and transmit, to an alert service, a notification identifying the object and each of the features matching each associated alert parameter of the one or more alert parameters, the notification including a location of the object.

20. The in-vehicle computing system of claim 19, wherein the notification further includes an indication of a confidence score indicating a likelihood that the object matches at least one of the one or more target objects, and wherein the first subset of scanning resources and/or the second subset of scanning resources is further based on a report from another vehicle that a reported object matching at least one alert parameter of the alert was identified, the first subset of scanning resources and/or the second subset of scanning resources being selected to include one or more scanning devices of the sensor subsystem that are positioned on a selected side of the vehicle, the selected side being selected based on an estimated approach direction of the reported object.

\* \* \* \* \*